US012711814B2

(12) United States Patent
Lengrand

(10) Patent No.: US 12,711,814 B2
(45) Date of Patent: Aug. 18, 2026

(54) VIRTUALIZED TEST ENVIRONMENT FOR VEHICLE TOPOLOGIES WITH MULTIPLE ELECTRONIC VEHICLE CONTROL UNITS

(71) Applicant: FORD GLOBAL TECHNOLOGIES, LLC, Dearborn, MI (US)

(72) Inventor: Blaise Lengrand, Heidelberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 612 days.

(21) Appl. No.: 18/060,357

(22) Filed: Nov. 30, 2022

(65) Prior Publication Data

US 2024/0177529 A1 May 30, 2024

(51) Int. Cl.
*G07C 5/00* (2006.01)
*G07C 5/08* (2006.01)

(52) U.S. Cl.
CPC ............. *G07C 5/008* (2013.01); *G07C 5/085* (2013.01)

(58) Field of Classification Search
CPC .. G07C 5/008; G07C 5/085; B60G 2800/802; B60Y 2306/15
USPC ............................. 701/29.2, 29.1, 32.8, 33.4
See application file for complete search history.

(56) References Cited

U.S. PATENT DOCUMENTS 8,880,277 B2 * 11/2014 Julson .................. G07C 5/0808 701/33.1
9,779,558 B2 * 10/2017 Correa ................. G07C 5/0808
9,824,512 B2 * 11/2017 Tseng ................. G05B 23/0297
10,594,587 B2 * 3/2020 Kim .................... H04L 41/0677
10,595,220 B2 * 3/2020 Morhart ................. H04B 17/17
2005/0159923 A1 * 7/2005 Huang .................. G06F 11/079 702/183
2006/0229777 A1 * 10/2006 Hudson ................ G05B 23/021 701/31.4
2007/0260373 A1 * 11/2007 Langer .................. G01M 17/04 701/31.4

(Continued)

FOREIGN PATENT DOCUMENTS

CN 112306520 A 2/2021

OTHER PUBLICATIONS

Mark Schwager, Comprehensive CAN Network Analysis and Test—An Overview, 2016, Vector, pp. 1-45 (pdf).*

*Primary Examiner* — Manglesh M Patel
(74) *Attorney, Agent, or Firm* — Frank A. MacKenzie; Brooks Kushman P.C.

(57) ABSTRACT

A device may receive a vehicle topology and may generate predefined processes for components of the vehicle topology. The device may provide, to a user device, data identifying the predefined processes, and may receive, from the user device, user-defined processes and a selection of particular predefined processes for execution of a test. The device may identify containers to be created for the user-defined processes and the particular predefined processes, and may identify virtual networks to interconnect the containers. The device may identify an order of execution for the user-defined processes and the particular predefined processes, and may generate a file that defines the containers, the virtual networks, and the order of execution. The device may cause the file to be implemented in a virtualized environment, and may orchestrate the test. The device may generate results based on orchestration of the test, and may perform actions based on the results.

20 Claims, 12 Drawing Sheets

(56) References Cited

U.S. PATENT DOCUMENTS

2008/0270104 A1* 10/2008 Stratton ................ G06F 21/577
703/23
2014/0282256 A1* 9/2014 Fish ....................... G07C 5/008
715/835
2015/0039176 A1* 2/2015 Fish ....................... G07C 5/008
701/31.6
2015/0149031 A1* 5/2015 Pfister ................. G01M 17/007
701/33.4
2016/0327615 A1* 11/2016 Wallace ................. G01R 31/52
2018/0331793 A9* 11/2018 Choi ....................... H04L 67/12
2019/0145861 A1* 5/2019 Persson ................ G07C 5/0825
701/33.2
2019/0235994 A1* 8/2019 Epperlein ............... H04L 41/40
2020/0341037 A1* 10/2020 Serret .................. G01R 31/327
2021/0185095 A1 6/2021 Harel et al.
2022/0188386 A1 6/2022 Jain et al.
2022/0247653 A1* 8/2022 Davies ................ H04L 41/0866
2024/0422027 A1* 12/2024 Lengyel .............. H04L 12/4645

* cited by examiner

VIRTUALIZED TEST ENVIRONMENT FOR VEHICLE TOPOLOGIES WITH MULTIPLE ELECTRONIC VEHICLE CONTROL UNITS

BACKGROUND

A vehicle, such as an autonomous vehicle (or AV), may include multiple electronic control units (ECUs) or nodes, programming instructions, and drivetrain components that are controllable by the multiple ECUs.

SUMMARY

Some implementations described herein relate to a method. The method may include receiving a vehicle topology associated with a vehicle, and generating predefined processes for components of the vehicle topology. The method may include providing, to a user device, data identifying the predefined processes for the components of the vehicle topology, and receiving, from the user device, one or more user-defined processes and a selection of one or more of the predefined processes for execution of a test. The method may include identifying one or more containers to be created for the one or more user-defined processes and the one or more of the predefined processes, and identifying one or more virtual networks to interconnect the one or more containers. The method may include identifying an order of execution for the one or more user-defined processes and the one or more of the predefined processes, and generating a file that defines the one or more containers, the one or more virtual networks, and the order of execution. The method may include causing the file to be implemented in a virtualized environment, and orchestrating the test via the one or more containers, the one or more virtual networks, and the order of execution. The method may include generating results based on orchestration of the test, and performing one or more actions based on the results.

Some implementations described herein relate to a device. The device may include one or more memories and one or more processors coupled to the one or more memories. The one or more processors may be configured to provide, to a user device, data identifying predefined processes for components of a vehicle topology associated with a vehicle, and receive, from the user device, one or more user-defined processes and a selection of one or more of the predefined processes for execution of a test. The one or more processors may be configured to identify one or more containers to be created for the one or more user-defined processes and the one or more of the predefined processes, and identify one or more virtual networks to interconnect the one or more containers. The one or more processors may be configured to identify an order of execution for the one or more user-defined processes and the one or more of the predefined processes, and generate a file that defines the one or more containers, the one or more virtual networks, and the order of execution. The one or more processors may be configured to cause the file to be implemented in a virtualized environment, and orchestrate the test via the one or more containers, the one or more virtual networks, and the order of execution. The one or more processors may be configured to generate results based on orchestration of the test, and perform one or more actions based on the results.

Some implementations described herein relate to a non-transitory computer-readable medium that stores a set of instructions for a device. The set of instructions, when executed by one or more processors of the device, may cause the device to receive a vehicle topology associated with a vehicle, and generate predefined processes for components of the vehicle topology. The set of instructions, when executed by one or more processors of the device, may cause the device to provide, to a user device, data identifying the predefined processes for the components of the vehicle topology, and receive, from the user device, one or more user-defined processes and a selection of one or more of the predefined processes for execution of a test. The set of instructions, when executed by one or more processors of the device, may cause the device to identify one or more containers to be created for the one or more user-defined processes and the one or more of the predefined processes, and identify one or more virtual networks to interconnect the one or more containers. The set of instructions, when executed by one or more processors of the device, may cause the device to identify an order of execution for the one or more user-defined processes and the one or more of the predefined processes, and cause the one or more containers, the one or more virtual networks, and the order of execution to be implemented in a virtualized environment. The set of instructions, when executed by one or more processors of the device, may cause the device to orchestrate the test via the one or more containers, the one or more virtual networks, and the order of execution, and generate results based on orchestration of the test. The set of instructions, when executed by one or more processors of the device, may cause the device to perform one or more actions based on the results.

DETAILED DESCRIPTION

Figure 1A:
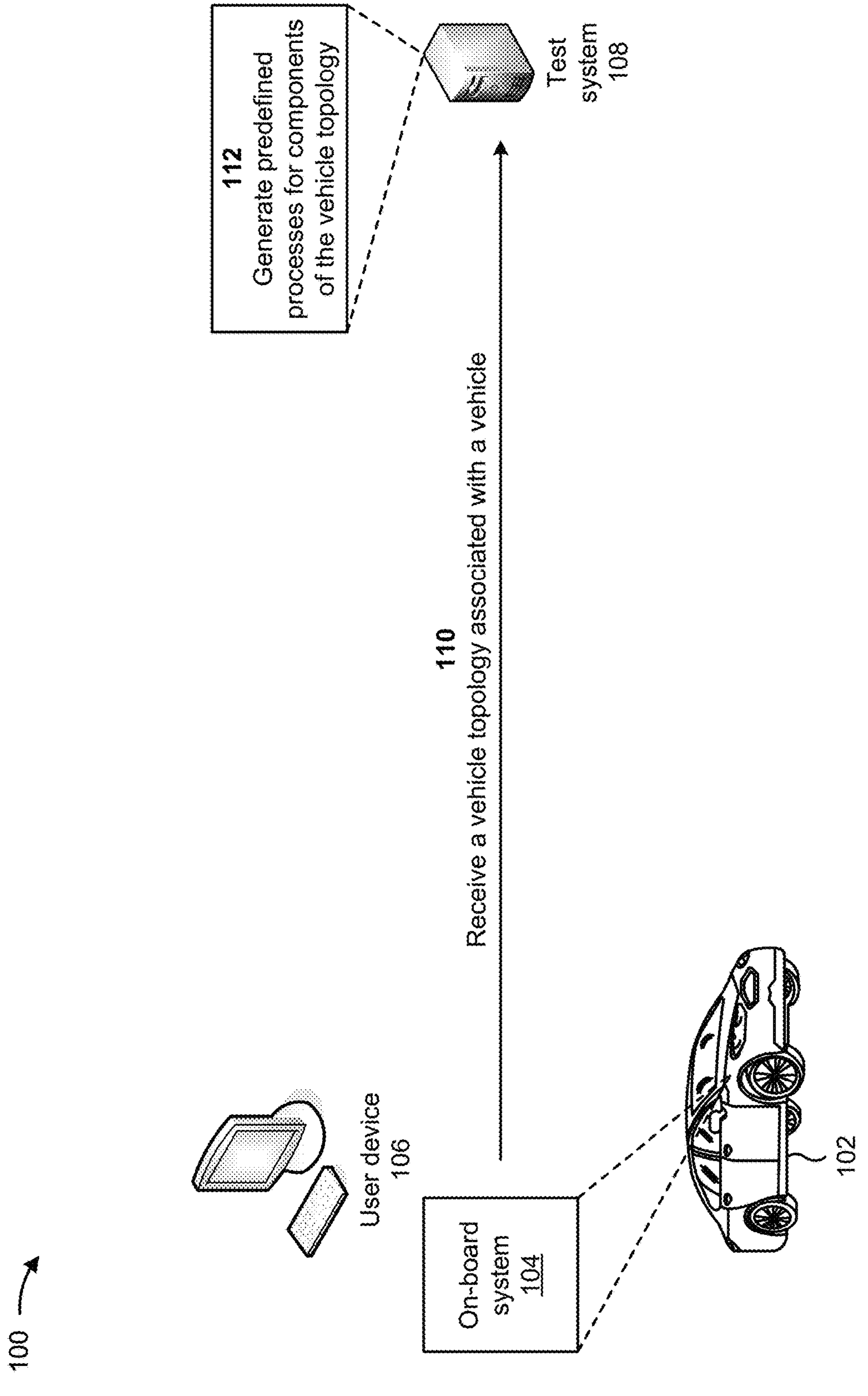
FIGS. 1A-1H are diagrams of an example environment for providing a virtualized test environment for vehicle topologies with multiple ECUs, in accordance with some aspects of the disclosure.

The following detailed description of example implementations refers to the accompanying drawings, which are incorporated herein and form a part of the specification. The same reference numbers in different drawings may identify the same or similar elements. In general, the left-most digit(s) of a reference number identifies the drawing in which the reference number first appears.

A vehicle may include an on-board system that is a distributed system with multiple ECUs or nodes. A distributed system may be difficult to test without a bench or at least minimal hardware that recreates a final topology of the distributed system. Also, such hardware have limitations in terms of flexibility (e.g., for attempting new software approaches), convenience (e.g., difficult to integrate seamlessly in a developer toolchain), and reliability (e.g., hardware may include moving parts or may retain an erroneous state that requires constant attention). In addition, it is expensive to test hardware from an asset perspective, a setup perspective, and a maintenance perspective. Therefore, distributed system testing may not occur until at or near a release or when specific changes are required that may affect inter-ECU communication. Distributed system testing may also require significant manually intervention for all the reasons mentioned above. This makes distributed system testing a highly ineffective process that prevents early identification of software issues and may reduce vehicle safety and reliability.

Therefore, current techniques for testing vehicle topologies with multiple ECUs consume computing resources (e.g., processing resources, memory resources, communication resources, and/or the like), networking resources, and/or the like associated with failing to detect and correct one or more software issues in the vehicle topologies, implementing a compromised vehicle topology with software issues, implementing an unsafe or unreliable vehicle due to a compromised vehicle topology, performing expensive and possibly unnecessary testing to correct a compromised vehicle topology, and/or the like.

Some implementations described herein relate to a test system that provides a virtualized test environment for vehicle topologies with multiple ECUs. For example, the test system may receive a vehicle topology associated with a vehicle, and may generate predefined processes for components of the vehicle topology. The test system may provide, to a user device, data identifying the predefined processes for the components of the vehicle topology, and may receive, from the user device, one or more user-defined processes and a selection of one or more of the predefined processes for execution of a test. The test system may identify one or more containers to be created for the one or more user-defined processes and the one or more of the predefined processes, and may identify one or more virtual networks to interconnect the one or more containers. The test system may identify an order of execution for the one or more user-defined processes and the one or more of the predefined processes, and may generate a file that defines the one or more containers, the one or more virtual networks, and the order of execution. The test system may cause the file to be implemented in a virtualized environment, and may orchestrate the test via the one or more containers, the one or more virtual networks, and the order of execution. The test system may generate results based on orchestration of the test, and may perform one or more actions based on the results.

In this way, the test system provides a virtualized test environment for vehicle topologies with multiple ECUs. The test system may create a virtualized test environment that emulates a vehicle topology to be tested, and may test new software or existing software. The test system may emulate various vehicle topologies (e.g., a vehicle with two high performance computers and one embedded ECU may be emulated with three virtual containers) and networks that interconnect the vehicle topologies together (e.g., an Ethernet-based network, a controller area network (CAN), and/or the like). The test system may deploy the containers and may orchestrate processes that execute on various containers. When execution of the processes is complete, the test system may report results of the test (e.g., error codes of associated with the processes). This, in turn, conserves computing resources, networking resources, and/or the like that would otherwise have been consumed in failing to detect and correct one or more software issues in the vehicle topologies, implementing a compromised vehicle topology with software issues, implementing an unsafe or unreliable vehicle due to a compromised vehicle topology, performing expensive and unnecessary testing to correct a compromised vehicle topology, and/or the like.

FIGS. 1A-1H are diagrams of an example environment 100 for providing a virtualized test environment for vehicle topologies with multiple ECUs, in accordance with some aspects of the disclosure. The environment 100 may include, for example, a vehicle 102, an on-board system 104 of the vehicle 102, a user device 106, and/or a test system 108. The vehicle 102 may include any moving form of conveyance that is capable of carrying one or more human occupants and/or cargo and that is powered by any form of energy. The on-board system 104 may be used to control the vehicle 102. The user device 106 may include a laptop computer, a desktop computer, a notebook computer, and/or the like. The test system 108 may include a system that provides a virtualized test environment for vehicle topologies with multiple ECUs. Further details of the vehicle 102, the on-board system 104, the user device 106, and the test system 108 are provided elsewhere herein.

In some implementations, the vehicle 102 may include, for example, a land vehicle (e.g., a car, a truck, a van, or a train), an aircraft (e.g., an unmanned aerial vehicle or a drone), or a watercraft. In the example of FIG. 1A, the vehicle 102 is a land vehicle, and is shown as a car. Furthermore, the vehicle 102 may be an autonomous vehicle in the example of FIG. 1A. An autonomous vehicle (or AV) is a vehicle having a processor, programming instructions, and drivetrain components that are controllable by the processor without requiring a human operator. An autonomous vehicle may be fully autonomous in that the autonomous vehicle does not require a human operator for most or all driving conditions and functions, or an autonomous vehicle may be semi-autonomous in that a human operator may be required in certain conditions or for certain operations, or that a human operator may override the autonomous vehicle's autonomous system and may take control of the autonomous vehicle.

In some implementations, the vehicle 102 may travel along a road in a semi-autonomous or autonomous manner. The vehicle 102 may be configured to detect objects in proximity of the vehicle 102. An object may include, for example, another vehicle (e.g., an autonomous vehicle or a non-autonomous vehicle that requires a human operator for most or all driving conditions and functions), a cyclist (e.g., a rider of a bicycle, electric scooter, or motorcycle), a pedestrian, a road feature (e.g., a roadway boundary, a lane marker, a sidewalk, a median, a guard rail, a barricade, a sign, a traffic signal, a railroad crossing, or a bike path), and/or another object that may be on a roadway or in proximity of a roadway, such as a tree or an animal.

As shown in FIG. 1A, and by reference number 110, the test system 108 may receive a vehicle topology associated with the vehicle 102. For example, the test system 108 may receive the vehicle topology associated with the vehicle 102 from the on-board system 104 or the user device 106. In some implementations, the test system 108 may request the vehicle topology from the on-board system 104, and the on-board system 104 may provide the vehicle topology to the test system 108 based on the request. Alternatively, the test system 108 may request the vehicle topology from the user device 106, and the user device 106 may provide the vehicle topology to the test system 108 based on the request. In some implementations, the vehicle topology may be stored in a data structure (e.g., a database, a table, a list, and/or the like) associated with the test system 108 (e.g., along with other vehicle topologies), and the test system 108 may retrieve the vehicle topology from the data structure.

The vehicle topology may include a distributed system with multiple ECUs or nodes. For example, the vehicle topology may include a topology of the on-board system 104, such as components of the on-board system 104. The components of the on-board system 104 may include, for example, a power system, one or more sensors, one or more controllers, an on-board computing device, and/or the like. The components of the on-board system 104 may communicate via a bus (e.g., one or more wired and/or wireless connections), such as a CAN bus. The components of the on-board system 104 may also include or be associated with software that controls the functionality of the components of the on-board system 104. In some implementations, the test system 108 may receive multiple different vehicle topologies associated with multiple different vehicles 102.

As further shown in FIG. 1A, and by reference number 112, the test system 108 may generate predefined processes for components of the vehicle topology. For example, the test system 108 may generate predefined software processes that, when executed, may simulate the components of the vehicle topology. In some implementations, the test system 108 may generate predefined processes for the power system of the on-board system 104, the one or more sensors of the on-board system 104, the one or more controllers (e.g., ECUs) of the on-board system 104, the on-board computing device of the on-board system 104, and/or the like. In some implementations, the test system 108 may utilize rules (e.g., Bazel rules) to generate the predefined processes that simulate the components of the vehicle topology. Bazel is a software tool for automation of building and testing software. A Bazel rule may define a series of actions that Bazel performs on inputs to produce a set of outputs that simulate the components of the vehicle topology. In some implementations, the predefined processes for the components of the vehicle topology may simulate a variety of use cases performed by the components of the vehicle topology. For example, the predefined processes for the one or more sensors may be configured to detect operational parameters of a vehicle and/or environmental conditions of an environment in which the vehicle operates. In another example, the predefined processes for the one or more controllers may be configured to control operation of a vehicle.

Figure 1B:
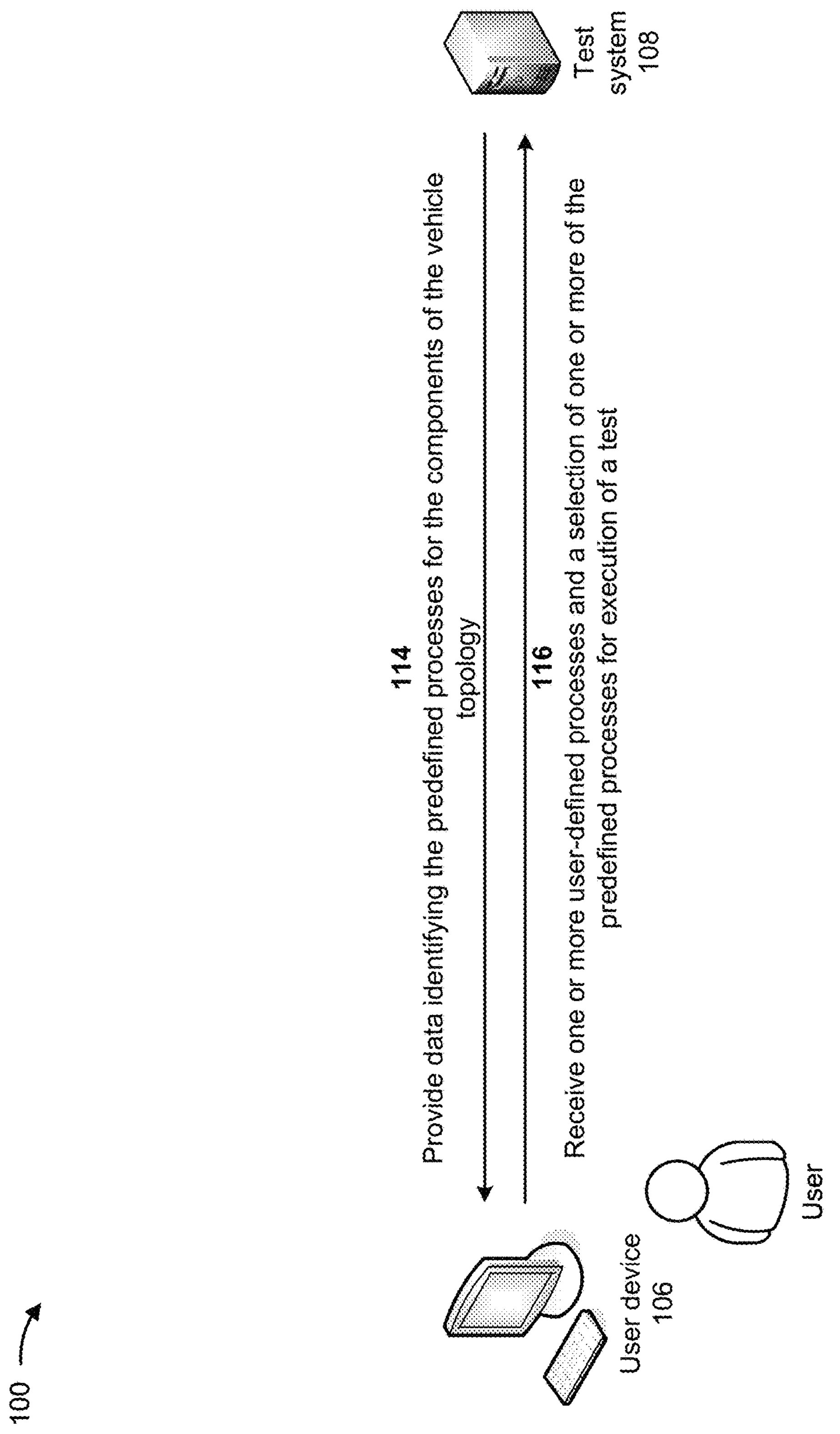

As shown in FIG. 1B, and by reference number 114, the test system 108 may provide data identifying the predefined processes for the components of the vehicle topology to the user device 106. For example, a user (e.g., a software developer) of the user device 106 may cause the user device 106 to request, from the test system 108, the data identifying the predefined processes for the components of the vehicle topology. The test system 108 may provide the data identifying the predefined processes for the components of the vehicle topology to the user device 106 based on the request. In some implementations, test system 108 may store the data identifying the predefined processes for the components of the vehicle topology in a library (e.g., a data structure) that the user device 106 may access to view the data identifying the predefined processes for the components of the vehicle topology.

As further shown in FIG. 1B, and by reference number 116, the test system 108 may receive, from the user device 106, one or more user-defined processes and a selection of one or more of the predefined processes for execution of a test. For example, the user may wish to perform a test of one or more components of the vehicle topology, and may utilize the user device 106 to create one or more user-defined processes for the test. When executed, the user-defined processes may simulate one or more components of the vehicle topology. In some implementations, the user device 106 may utilize rules (e.g., Bazel rules) to generate the user-defined processes that simulate the one or more components of the vehicle topology.

The user may utilize the user device 106 to review the data identifying the predefined processes for the components of the vehicle topology, and to select the one or more of the predefined processes for the test. The user device 106 may provide the selection of the one or more of the predefined processes for the test to the test system 108, and the test system 108 may receive the selection of the one or more of the predefined processes from the user device 106.

Figure 1C:
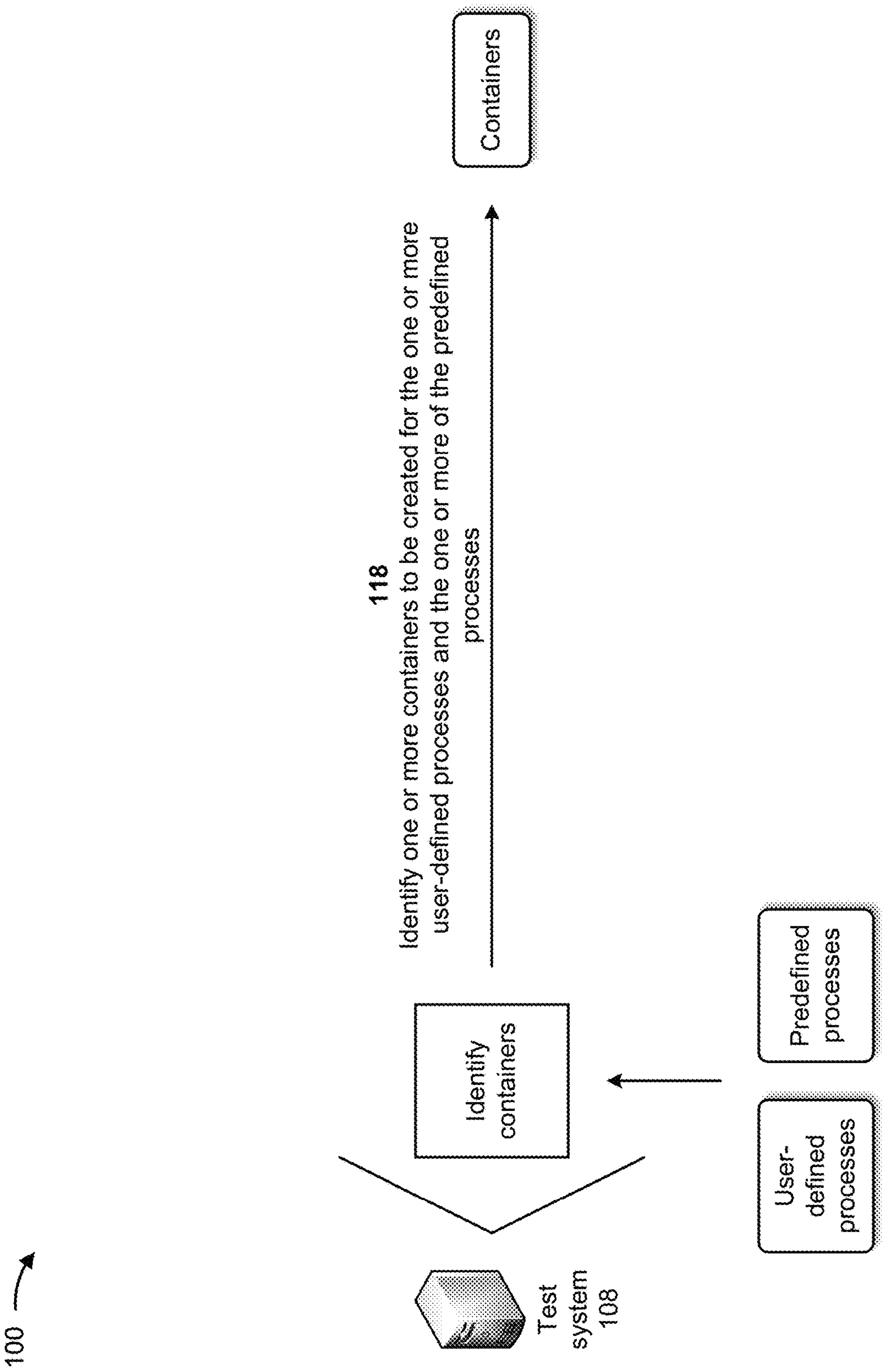

As shown in FIG. 1C, and by reference number 118, the test system 108 may identify one or more containers to be created for the one or more user-defined processes and the one or more of the predefined processes. For example, the test system 108 may execute the test in a virtualized environment (e.g., a cloud-computing environment) that includes one or more containers. The test system 108 may analyze requirements for the user-defined processes (e.g., processing requirements, memory requirements, communication requirements, and/or the like), and may identify containers in the virtualized environment capable of handling the requirements for the user-defined processes. The test system 108 may analyze requirements for the predefined processes (e.g., processing requirements, memory requirements, communication requirements, and/or the like), and may identify additional containers in the virtualized environment capable of handling the requirements for the predefined processes. In some implementations, each of the one or more user-defined processes may be assigned to a corresponding container of the virtualized environment, each of the one or more of the predefined processes may be assigned to a corresponding container of the virtualized environment, multiple user-defined processes and/or predefined processes may be assigned to a single container of the virtualized environment, and/or the like. For example, if the on-board system 104 includes two sensors and three controllers, the test system 108 may identify five containers of the virtualized environment (e.g., a container for each of the two sensors and each of the three controllers).

Figure 1D:
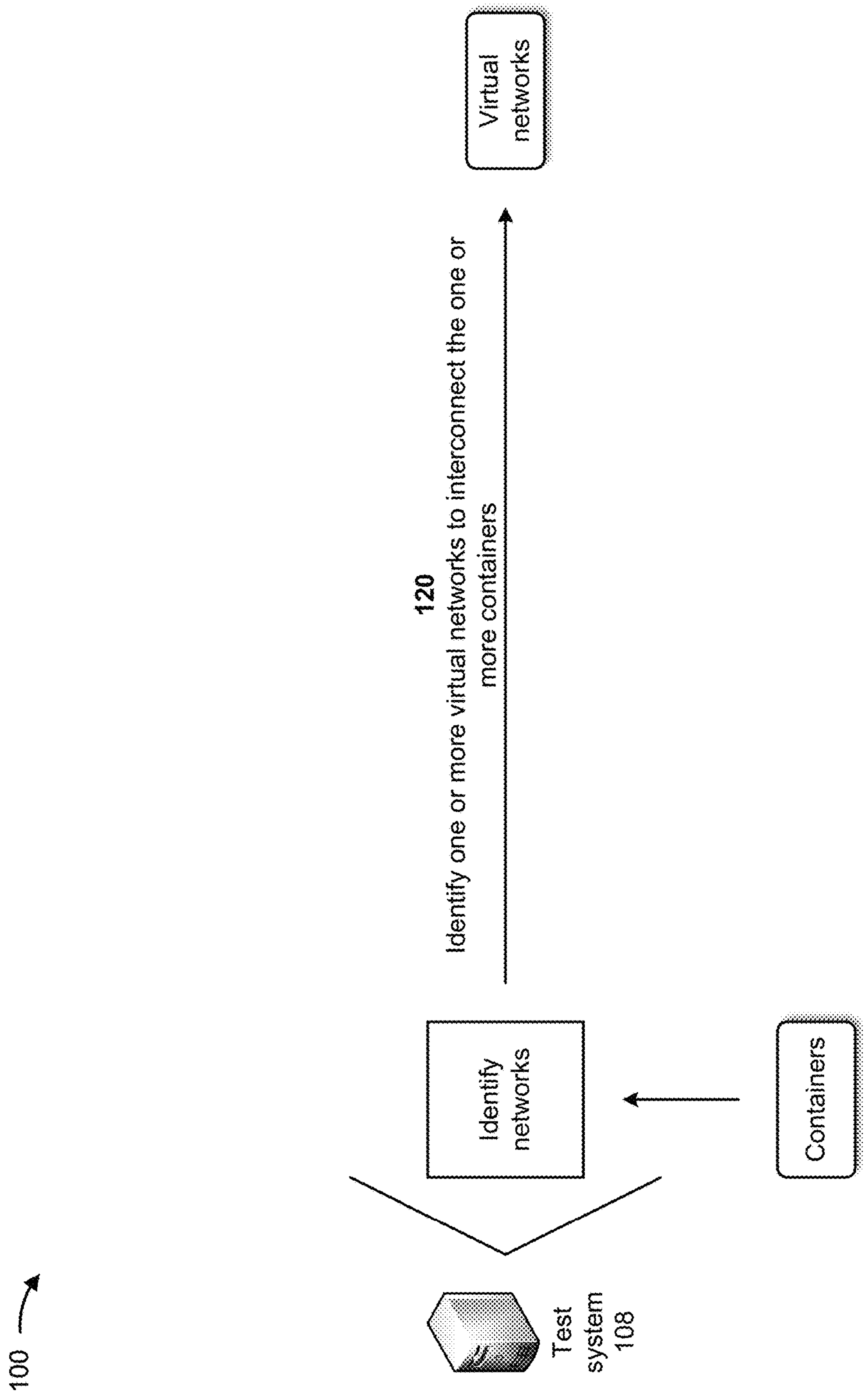

As shown in FIG. 1D, and by reference number 120, the test system 108 may identify one or more virtual networks to interconnect the one or more containers. For example, the vehicle topology may include networks (e.g., Ethernet-based networks, CANs, and/or the like) that interconnect the components of the vehicle topology. The test system 108 may analyze the vehicle topology to identify the networks of the vehicle topology, and may determine requirements (e.g., processing requirements, memory requirements, communication requirements, and/or the like) for the networks. The test system 108 may identify virtual networks in the virtualized environment capable of handling the requirements for the networks. In some implementations, each of the networks of the vehicle topology may be assigned to a corresponding virtual network of the virtualized environment, a corresponding container of the virtualized environment, and/or the like.

Figure 1E:
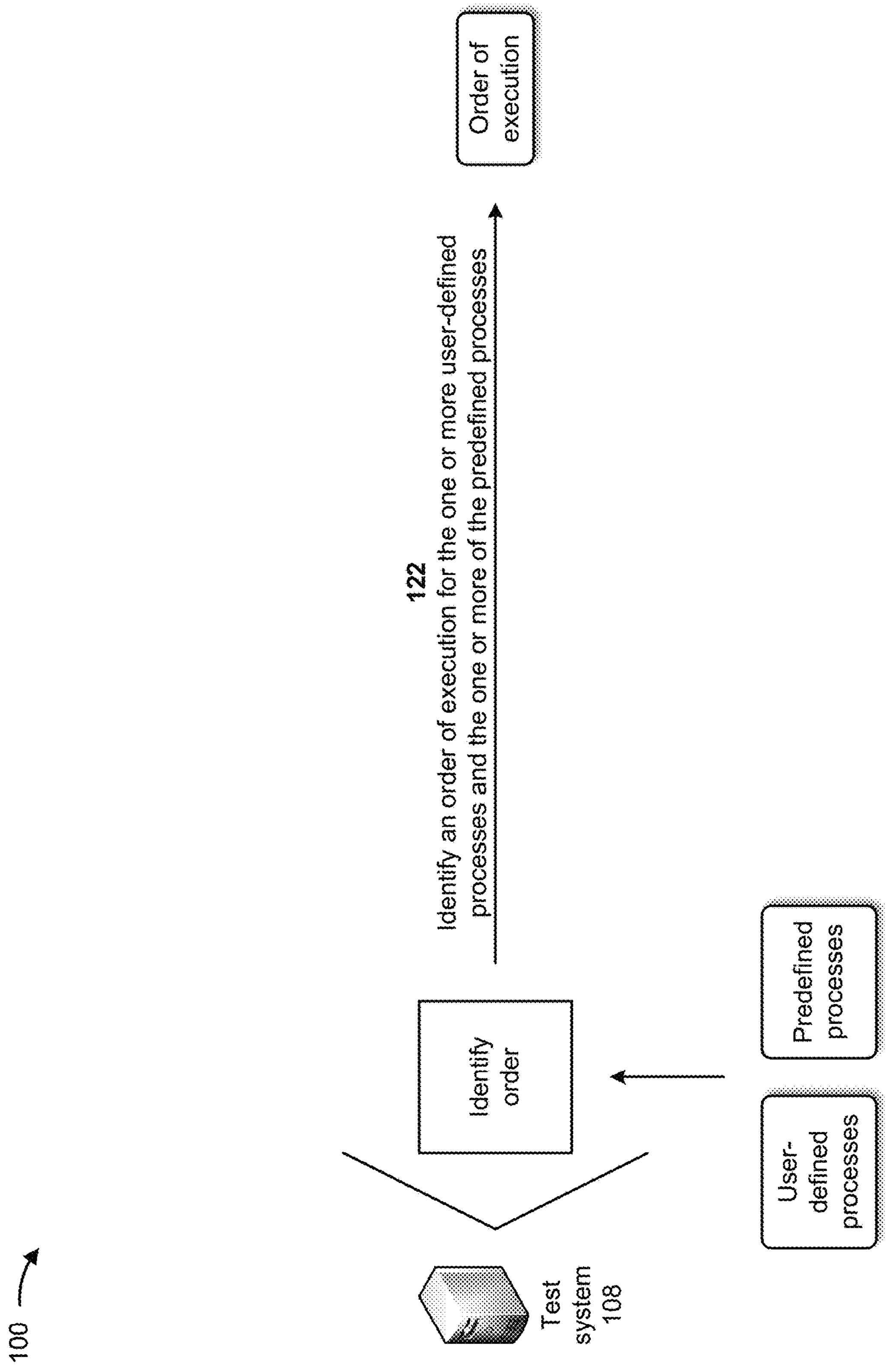

As shown in FIG. 1E, and by reference number 122, the test system 108 may identify an order of execution for the one or more user-defined processes and the one or more of the predefined processes. For example, the test system 108 may analyze the processes of the one or more user-defined processes and the one or more of the predefined processes, and may identify the order of execution for the processes based on the analysis. In some implementations, the test system 108 may determine that two or more processes may be concurrently executed in a container or multiple containers, that two or more processes may be sequentially executed in an order of execution, and/or the like. For example, the test system 108 may determine that processes simulating the sensors of the vehicle topology may be concurrently executed in the virtualized environment. In another example, the test system 108 may determine a process simulating a controller is to be executed in the virtualized environment before another process simulating another controller is to be executed in the virtualized environment.

Figure 1F:
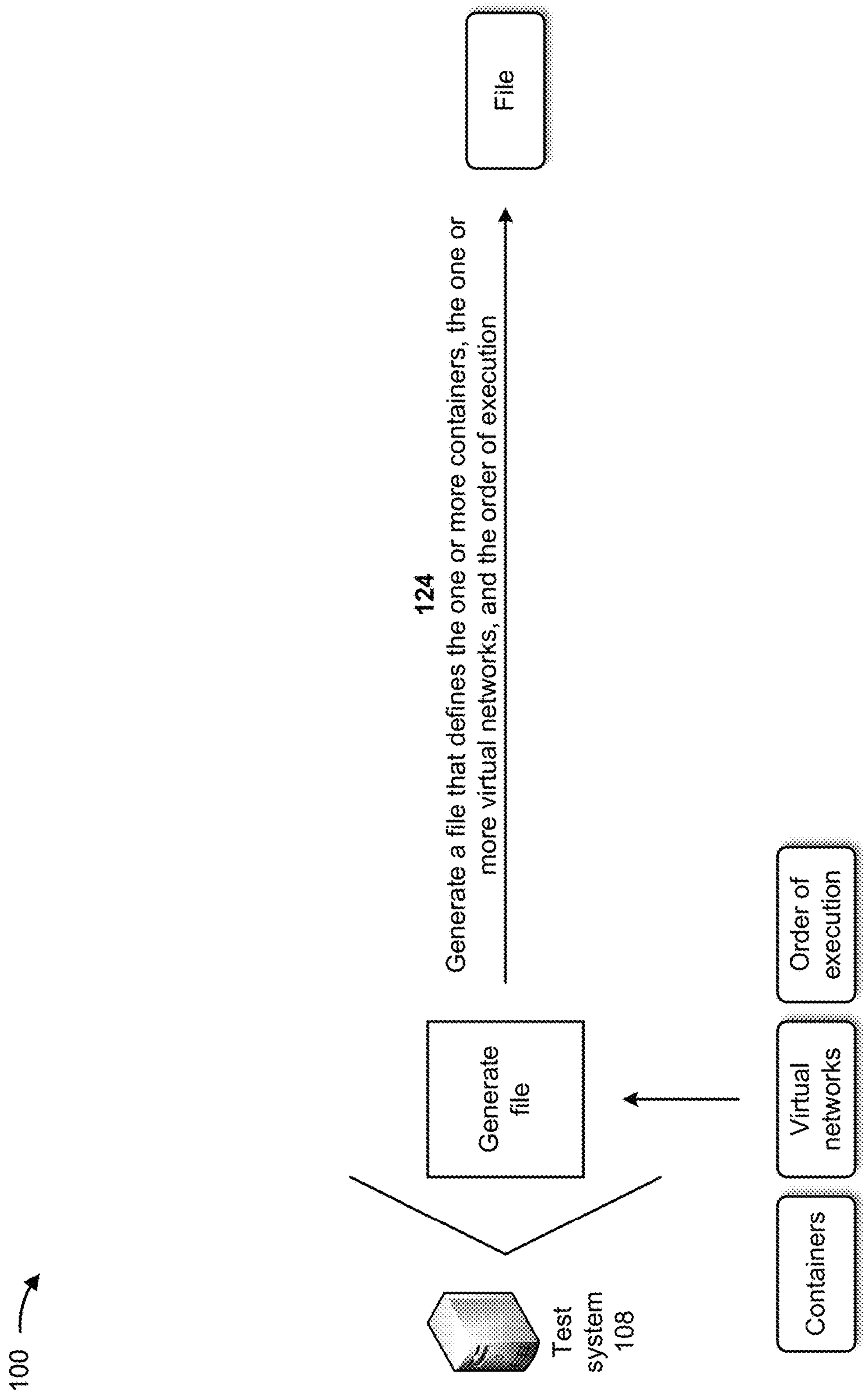

As shown in FIG. 1F, and by reference number 124, the test system 108 may generate a file that defines the one or more containers, the one or more virtual networks, and the order of execution. For example, the test system 108 may generate a compose file that defines the one or more containers (e.g., docker containers) that need to be created by the virtualized environment, the one or more virtual networks that need to be created by the virtualized environment, the order of execution of the processes associated with the one or more containers, and/or the like. In some implementations, the file may include instructions that cause the virtualized environment to create the one or more containers, create the one or more virtual networks, and execute the test based on the order of execution and via the one or more containers and the one or more virtual networks. In some implementations, the test system 108 may include a virtualized environment that executes the test based on the file, the test system 108 may provide the file to a separate virtualized environment that executes the test based on the file, and/or the like.

Figure 1G:
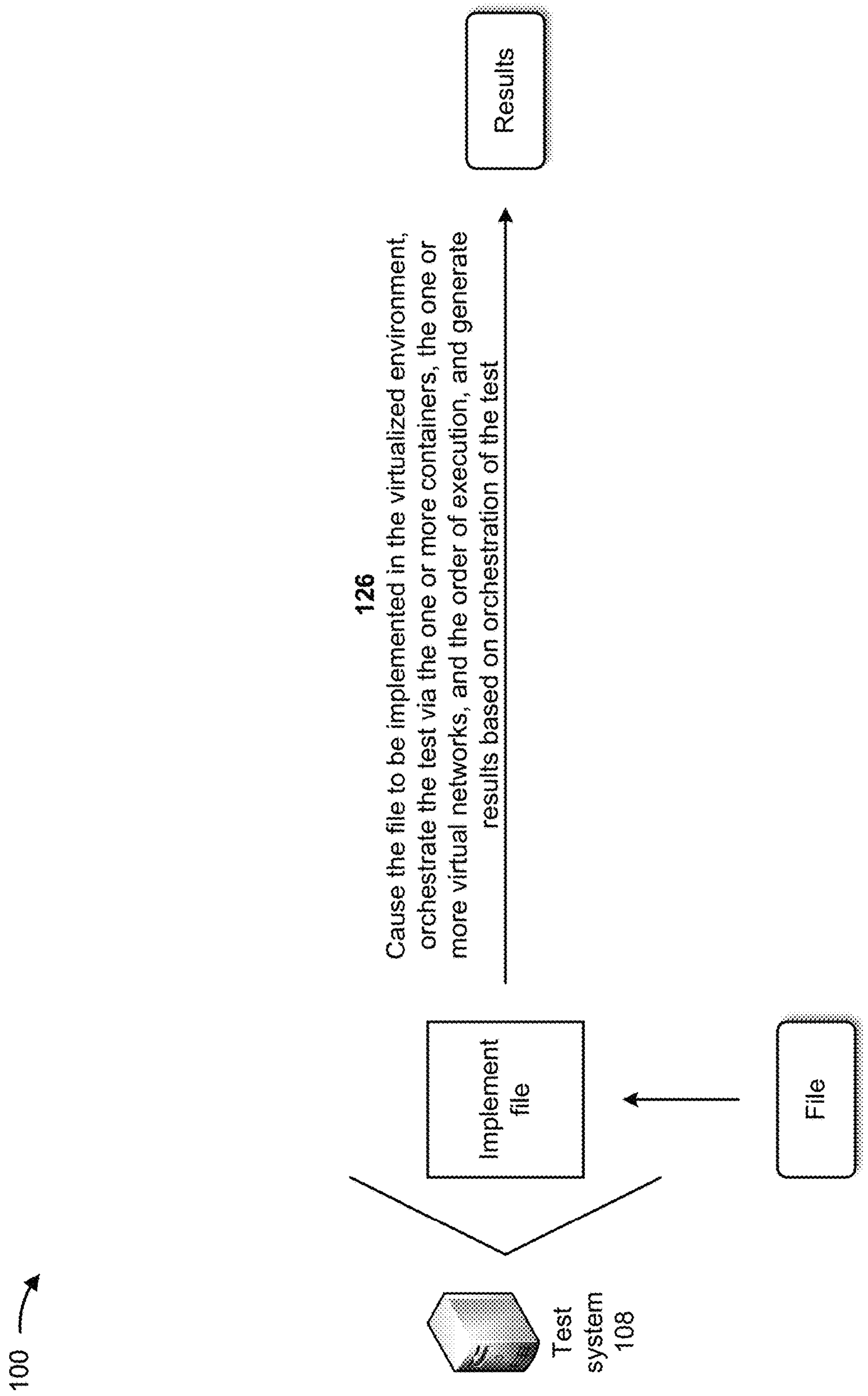

As shown in FIG. 1G, and by reference number 126, the test system 108 may cause the file to be implemented in the virtualized environment, may orchestrate the test via the one or more containers, the one or more virtual networks, and the order of execution, and may generate results based on orchestration of the test. For example, the test system 108 may provide the file to the virtualized environment, and the file may cause the virtualized environment to configure the one or more containers and the one or more virtual networks. The file may also cause the virtualized environment to execute the test based on the order of execution and via the one or more containers and the one or more virtual networks. The test system 108 may monitor the test, during execution of the test by the virtualized environment, and may provide additional instructions to the virtualized environment based on monitoring the test. For example, based on monitoring the execution of the test, the test system 108 may determine that a first container has excess capacity and that a second container is overloaded. In such an example, the test system 108 may instruct the virtualized environment to offload some processing of the second container to the first container. In some implementations, the test system 108 may orchestrate the execution of the test until the test is complete and the results are generated based on orchestration of the test. The results may include information identifying outputs of the simulated power system, the simulated sensors, the simulated controllers, the simulated on-board computing device, etc.; errors generated by the simulated power system, the simulated sensors, the simulated controllers, the simulated on-board computing device, etc.; and/or the like.

Figure 1H:
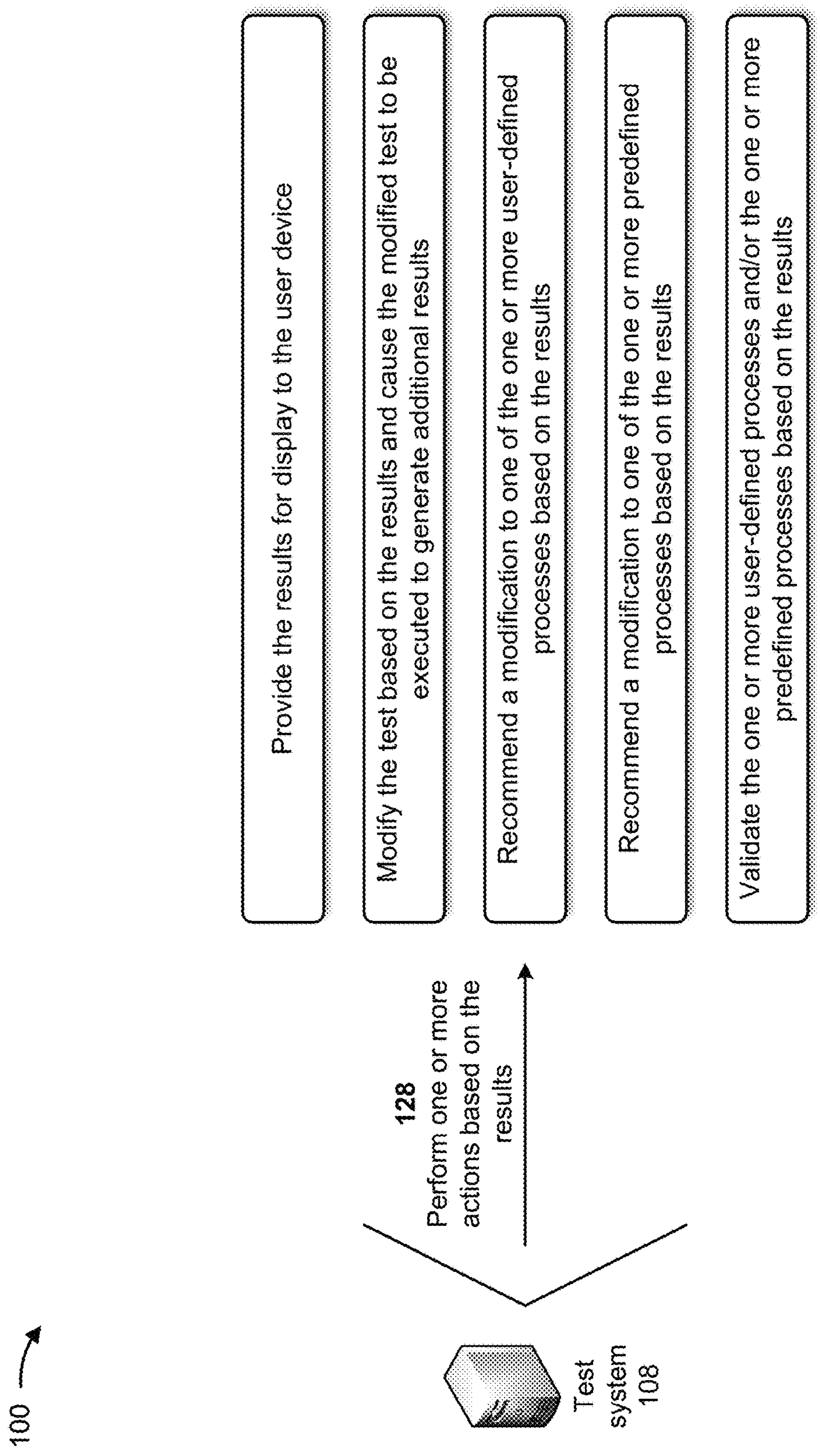

As shown in FIG. 1H, and by reference number 128, the test system 108 may perform one or more actions based on the results. In some implementations, performing the one or more actions includes the test system 108 providing the results for display to the user device 106. For example, the test system 108 may provide the results to the user device 106, and the user device 106 may display the results to the user. The results may enable the user to determine whether the vehicle topology will experience errors if the test is executed on the actual vehicle topology. In this way, the test system 108 may conserve computing resources, networking resources, and/or the like that would otherwise have been consumed in failing to detect and correct one or more software issues in the vehicle topology.

In some implementations, performing the one or more actions includes the test system 108 modifying the test based on the results and causing the modified test to be executed to generate additional results. For example, the test system 108 may analyze the results and may determine that the results indicate that the test was inconclusive. The test system 108 may modify the test to generate a modified test, and may cause the modified test to be executed to generate additional results that are more conclusive. In this way, the test system 108 may conserve computing resources, networking resources, and/or the like that would otherwise have been consumed in implementing a compromised vehicle topology with software issues.

In some implementations, performing the one or more actions includes the test system 108 recommending a modification to one of the one or more user-defined processes based on the results. For example, the test system 108 may analyze the results and may determine that the results indicate that the test was inconclusive. The test system 108 may generate a recommendation to modify one of the one or more user-defined processes based on the inconclusive test, and may provide the recommendation to the user device 106. The user device 106 may receive the recommendation and may request that the test system 108 implement the recommendation. In this way, the test system 108 may conserve computing resources, networking resources, and/or the like that would otherwise have been consumed in implementing an unsafe or unreliable vehicle due to a compromised vehicle topology.

In some implementations, performing the one or more actions includes the test system 108 recommending a modification to one of the one or more predefined processes based on the results. For example, the test system 108 may analyze the results and may determine that the results indicate that the test was inconclusive. The test system 108 may generate a recommendation to modify one of the one or more predefined processes based on the inconclusive test, and may provide the recommendation to the user device 106. The user device 106 may receive the recommendation and may request that the test system 108 implement the recommendation. In this way, the test system 108 may conserve computing resources, networking resources, and/or the like that would otherwise have been consumed in performing expensive and unnecessary testing to correct a compromised vehicle topology.

In some implementations, performing the one or more actions includes the test system 108 validating the one or more user-defined processes and/or the one or more predefined processes based on the results. For example, the test system 108 may analyze the results and may determine that the results indicate that the test was conclusive. The test system 108 may validate the one or more user-defined processes and/or the one or more predefined processes based on the conclusive test, which may assure future users of the validity of the one or more user-defined processes and/or the one or more predefined processes. In this way, the test system 108 may conserve computing resources, networking resources, and/or the like that would otherwise have been consumed in failing to detect and correct one or more software issues in the vehicle topology.

In some implementations, the test system 108 may enable a developer to test variants of the vehicle topology for a future platform, to add multiple nodes to create stress tests for a communication protocol, and/or the like. A developer may execute tests directly on the user device 106 with a single command line to ensure that changes do not affect other tests. In some implementations, the test system 108 may ensure isolation and reproducibility of tests and may automatically determine all dependencies needed for a test. In some implementations, the test system 108 may create each test from scratch to prevent remaining erroneous states from other tests from affecting results of the test.

In this way, the test system 108 provides a virtualized test environment for vehicle topologies with multiple ECUs. The test system 108 may create a virtualized test environment that emulates a vehicle topology to be tested, and may test new software or existing software. The test system 108 may emulate various vehicle topologies (e.g., a vehicle 102 with two high performance computers and one embedded ECU may be emulated with three virtual containers) and networks that interconnect the vehicle topologies together (e.g., an Ethernet-based network, a CAN, and/or the like). The test system 108 may deploy the containers and may orchestrate processes that execute on various containers. When execution of the processes is complete, the test system 108 may report results of the test (e.g., error codes of associated with the processes). This, in turn, conserves computing resources, networking resources, and/or the like that would otherwise have been consumed in failing to detect and correct one or more software issues in the vehicle topologies, implementing a compromised vehicle topology with software issues, implementing an unsafe or unreliable vehicle due to a compromised vehicle topology, performing expensive and unnecessary testing to correct a compromised vehicle topology, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
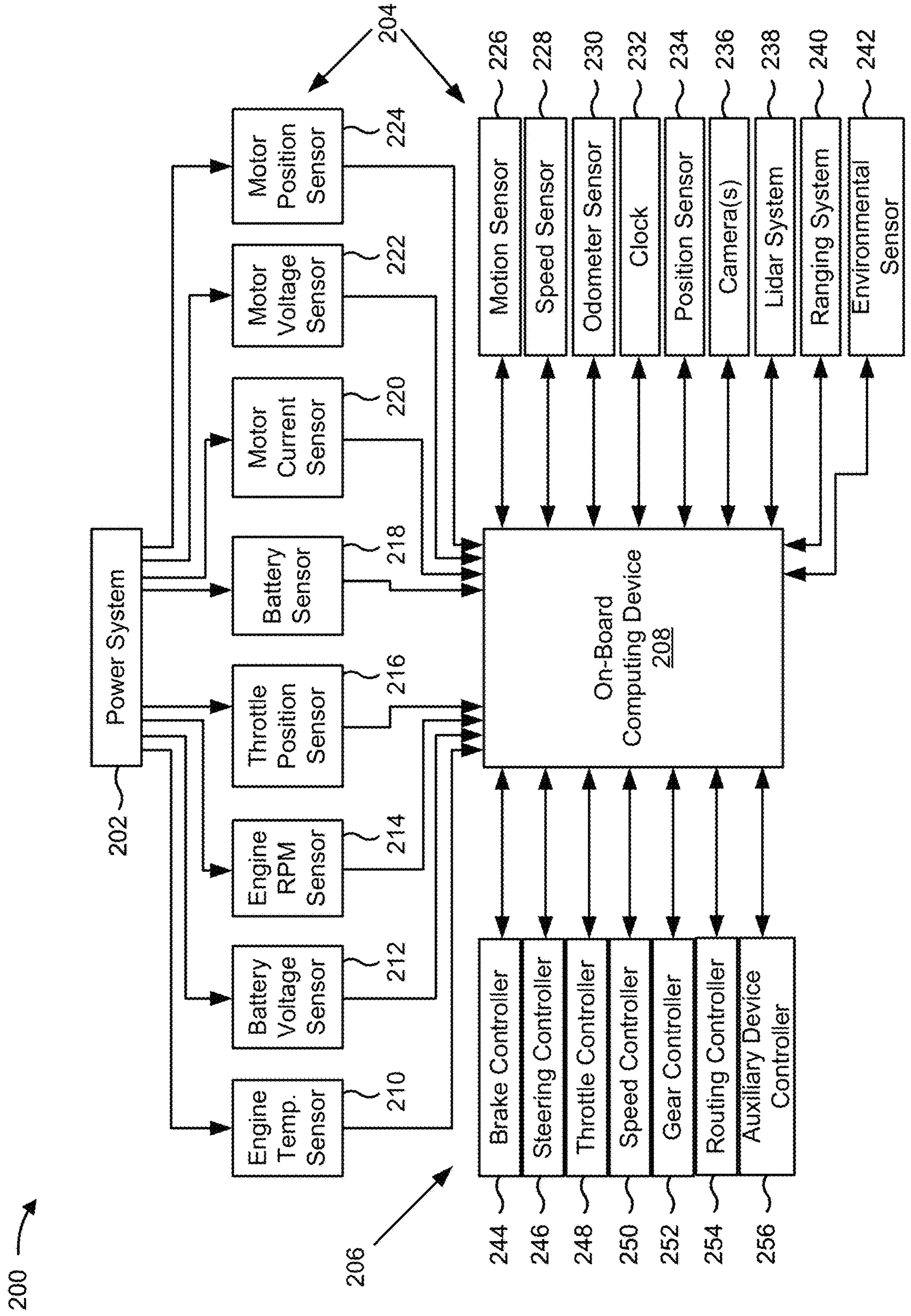
FIG. 2 is a diagram of an example on-board system of a vehicle, in accordance with some aspects of the disclosure.

FIG. 2 is a diagram of an example on-board system 200 of an autonomous vehicle, in accordance with some aspects of the disclosure. In some implementations, the on-board system 200 may correspond to the on-board system 104 included in the vehicle 102, as described above in connection with FIG. 1. As shown in FIG. 2, the on-board system 200 may include one or more of the illustrated components 202-256. The components of the on-board system 200 may include, for example, a power system 202, one or more sensors 204, one or more controllers 206, and/or an on-board computing device 208. The components of the on-board system 200 may communicate via a bus (e.g., one or more wired and/or wireless connections), such as a CAN bus.

The power system 202 may be configured to generate mechanical energy for the vehicle 102 to move the vehicle 102. For example, the power system 202 may include an engine that converts fuel to mechanical energy (e.g., via combustion) and/or a motor that converts electrical energy to mechanical energy.

The one or more sensors 204 may be configured to detect operational parameters of the vehicle 102 and/or environmental conditions of an environment in which the vehicle 102 operates. For example, the one or more sensors 204 may include an engine temperature sensor 210, a battery voltage sensor 212, an engine revolutions per minute (RPM) sensor 214, a throttle position sensor 216, a battery sensor 218 (to measure current, voltage, and/or temperature of a battery), a motor current sensor 220, a motor voltage sensor 222, a motor position sensor 224 (e.g., a resolver and/or encoder), a motion sensor 226 (e.g., an accelerometer, gyroscope and/or inertial measurement unit), a speed sensor 228, an odometer sensor 230, a clock 232, a position sensor 234 (e.g., a global navigation satellite systems (GNSS) sensor and/or a global positioning system (GPS) sensor), one or more cameras 236, a lidar system 238, one or more other ranging systems 240 (e.g., a radar system and/or a sonar system), and/or an environmental sensor 242 (e.g., a precipitation sensor and/or ambient temperature sensor).

The one or more controllers 206 may be configured to control operation of the vehicle 102. For example, the one or more controllers 206 may include a brake controller 244 to control braking of the vehicle 102, a steering controller 246 to control steering and/or direction of the vehicle 102, a throttle controller 248 and/or a speed controller 250 to control speed and/or acceleration of the vehicle 102, a gear controller 252 to control gear shifting of the vehicle 102, a routing controller 254 to control navigation and/or routing of the vehicle 102 (e.g., using map data), and/or an auxiliary device controller 256 to control one or more auxiliary devices associated with the vehicle 102, such as a testing device, an auxiliary sensor, and/or a mobile device transported by the vehicle 102.

The on-board computing device 208 may be configured to receive sensor data from one or more sensors 204 and/or to provide commands to one or more controllers 206. For example, the on-board computing device 208 may control operation of the vehicle 102 by providing a command to a controller 206 based on sensor data received from a sensor 204. In some implementations, the on-board computing device 208 may be configured to process sensor data to generate a command. The on-board computing device 208 may include memory, one or more processors, an input component, an output component, and/or a communication component, as described in more detail elsewhere herein.

As an example, the on-board computing device 208 may receive navigation data, such as information associated with a navigation route from a start location of the vehicle 102 to a destination location for the vehicle 102. In some implementations, the navigation data is accessed and/or generated by the routing controller 254. For example, the routing controller 254 may access map data and identify routes and/or road segments that the vehicle 102 can travel to move from the start location to the destination location. In some implementations, the routing controller 254 may identify a preferred route, such as by scoring multiple routes, applying one or more routing techniques (e.g., minimum Euclidean distance, Dijkstra's algorithm, and/or Bellman-Ford algorithm), accounting for traffic data, and/or receiving a user selection of a route, among other examples. The on-board computing device 208 may use the navigation data to control operation of the vehicle 102.

As the vehicle travels along the route, the on-board computing device 208 may receive sensor data from various sensors 204. For example, the position sensor 234 may provide geographic location information to the on-board computing device 208, which may then access a map associated with the geographic location information to determine known fixed features associated with the geographic location, such as streets, buildings, stop signs, and/or traffic signals, which may be used to control operation of the vehicle 102.

In some implementations, the on-board computing device 208 may receive one or more images captured by one or more cameras 236, may analyze the one or more images (e.g., to detect object data), and may control operation of the vehicle 102 based on analyzing the images (e.g., to avoid detected objects). Additionally, or alternatively, the on-board computing device 208 may receive object data associated with one or more objects detected in a vicinity of the vehicle 102 and/or may generate object data based on sensor data. The object data may indicate the presence of absence of an object, a location of the object, a distance between the object and the vehicle 102, a speed of the object, a direction of movement of the object, an acceleration of the object, a trajectory (e.g., a heading) of the object, a shape of the object, a size of the object, a footprint of the object, and/or a type of the object (e.g., a vehicle, a pedestrian, a cyclist, a stationary object, or a moving object). The object data may be detected by, for example, one or more cameras 236 (e.g., as image data), the lidar system 238 (e.g., as lidar data) and/or one or more other ranging systems 240 (e.g., as radar data or sonar data). The on-board computing device 208 may process the object data to detect objects in proximity of the vehicle 102 and/or to control operation of the vehicle 102 based on the object data (e.g., to avoid detected objects).

In some implementations, the on-board computing device 208 may use the object data (e.g., current object data) to predict future object data for one or more objects. For example, the on-board computing device 208 may predict a future location of an object, a future distance between the object and the vehicle 102, a future speed of the object, a future direction of movement of the object, a future acceleration of the object, and/or a future trajectory (e.g., a future heading) of the object. For example, if an object is a vehicle and map data indicates that the vehicle is at an intersection, then the on-board computing device 208 may predict whether the object will move straight or turn. As another example, if the sensor data and/or the map data indicates that the intersection does not have a traffic light, then the on-board computing device 208 may predict whether the object will stop prior to entering the intersection.

The on-board computing device 208 may generate a motion plan for the vehicle 102 based on sensor data, navigation data, and/or object data (e.g., current object data and/or future object data). For example, based on current locations of objects and/or predicted future locations of objects, the on-board computing device 208 may generate a motion plan to move the vehicle 102 along a surface and avoid collision with other objects. In some implementations, the motion plan may include, for one or more points in time, a speed of the vehicle 102, a direction of the vehicle 102, and/or an acceleration of the vehicle 102. Additionally, or alternatively, the motion plan may indicate one or more actions with respect to a detected object, such as whether to overtake the object, yield to the object, pass the object, or the like. The on-board computing device 208 may generate one or more commands or instructions based on the motion plan, and may provide those command(s) to one or more controllers 206 for execution.

As indicated above, FIG. 2 is provided as an example. Other examples may differ from what is described with regard to FIG. 2. The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single components, or a single components shown in FIG. 2 may be implemented as multiple, distributed components. Additionally, or alternatively, a set of components (e.g., one or more components) shown in FIG. 2 may perform one or more functions described as being performed by another set of components shown in FIG. 2. For example, although some components of FIG. 2 are primarily associated with land vehicles, other types of vehicles are within the scope of the disclosure. As an example, an on-board system of an aircraft may not include the brake controller 244 and/or the gear controller 252, but may include an altitude sensor. As another example, an on-board system of a watercraft may include a depth sensor.

Figure 3:
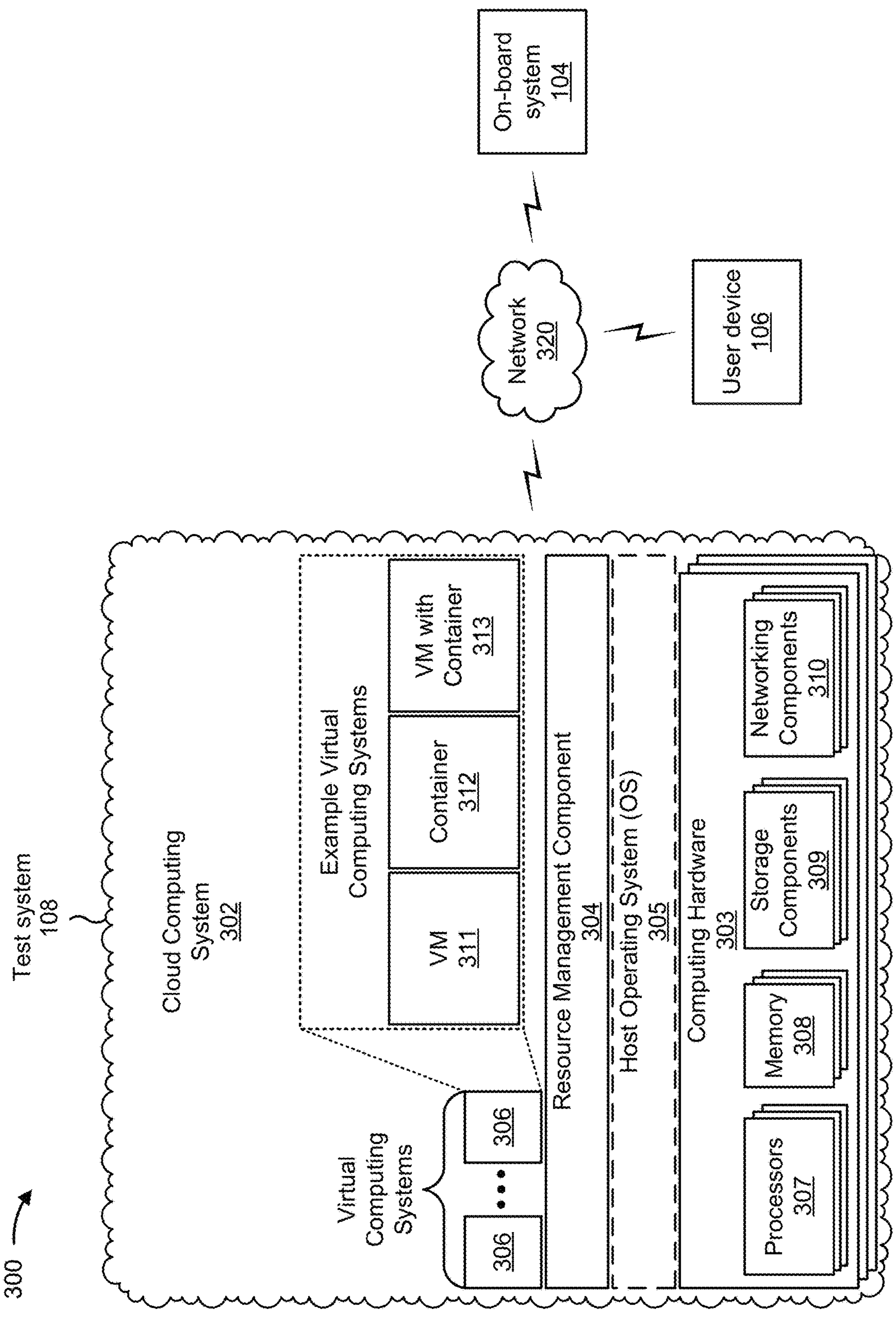
FIG. 3 is a diagram of an example environment in which systems and/or methods described herein may be implemented, in accordance with some aspects of the disclosure.

FIG. 3 is a diagram of an example environment 300 in which systems and/or methods described herein may be implemented, in accordance with some aspects of the disclosure. As shown in FIG. 3, the environment 300 may include the test system 108, which may include one or more elements of and/or may execute within a cloud computing system 302. The cloud computing system 302 may include one or more elements 303-313, as described in more detail below. As further shown in FIG. 3, the environment 300 may include the on-board system 104, the user device 106, and/or a network 320. Devices and/or elements of the environment 300 may interconnect via wired connections and/or wireless connections.

The on-board system 104 may be integrated into and/or coupled with the vehicle 102. In general, the on-board system 104 may be used to control the vehicle 102, to sense information about the vehicle 102 and/or an environment in which the vehicle 102 operates, to detect one or more objects in proximity of the vehicle, to provide output to or receive input from an occupant of the vehicle 102, and/or to communicate with one or more devices remote from the vehicle 102, such as another vehicle and/or the test system 108. The on-board system 104 is described in more detail above in connection with FIG. 2.

The user device 106 includes one or more devices capable of receiving, generating, storing, processing, and/or providing information, as described elsewhere herein. The user device 106 may include a communication device and/or a computing device. For example, the user device 106 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the test system 108 may include one or more elements 303-313 of the cloud computing system 302, may execute within the cloud computing system 302, and/or may be hosted within the cloud computing system 302, in some implementations, the test system 108 may not be cloud-based (e.g., may be implemented outside of a cloud computing system) or may be partially cloud-based. For example, the test system 108 may include one or more devices that are not part of the cloud computing system 302, such as a device 400 of FIG. 4, which may include a standalone server or another type of computing device. The test system 108 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
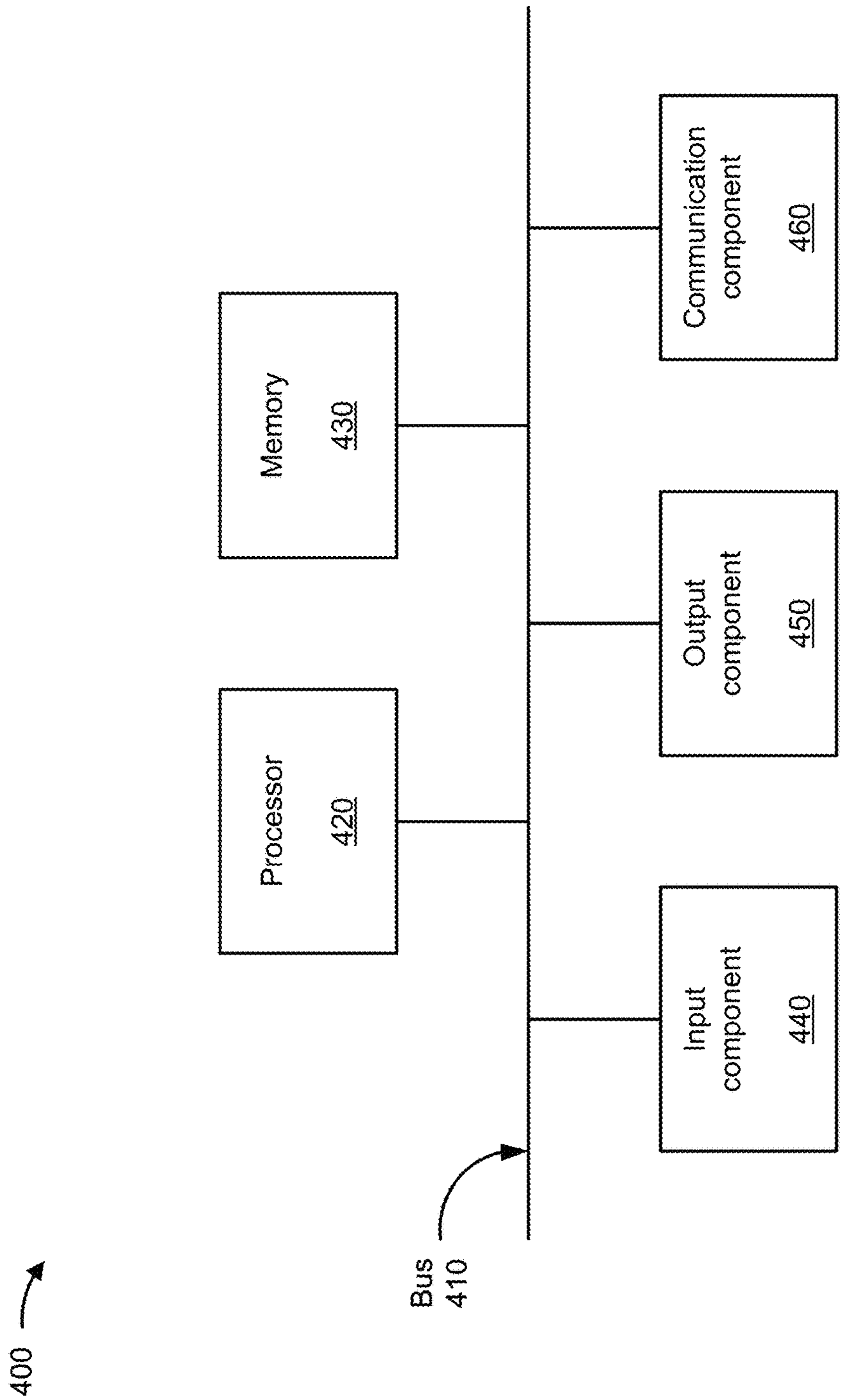
FIG. 4 is a diagram of example components of one or more devices of FIG. 3, in accordance with some aspects of the disclosure.

FIG. 4 is a diagram of example components of a device 400, which may correspond to the on-board system 104, the user device 106, and/or the test system 108, in accordance with some aspects of the disclosure. In some implementations, the on-board system 104, the user device 106, and/or the test system 108 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
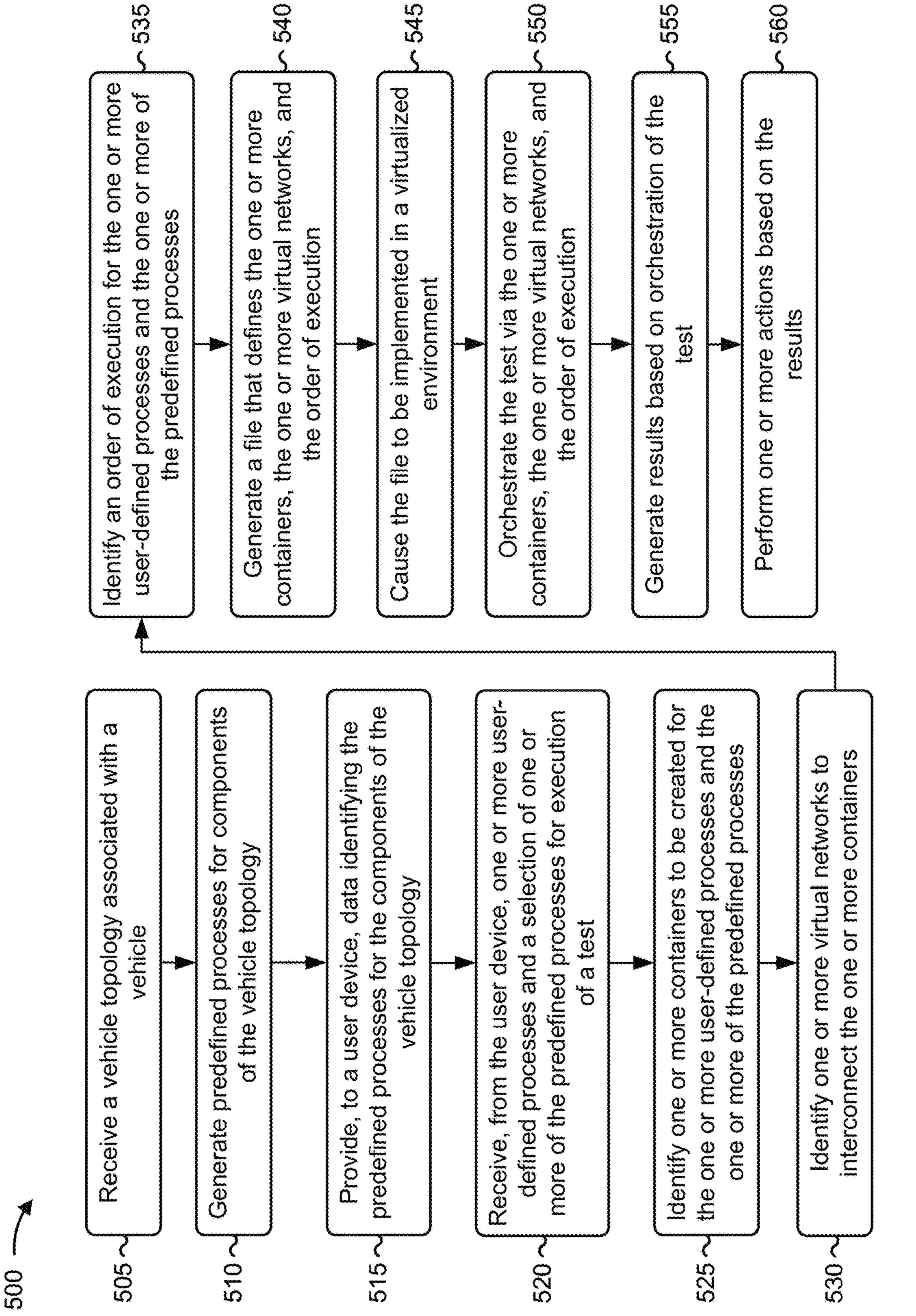
FIG. 5 is a flowchart of an example process for providing a virtualized test environment for vehicle topologies with multiple ECUs, in accordance with some aspects of the disclosure.

FIG. 5 is a flowchart of an example method 500 associated with virtualized test environment for vehicle topologies with multiple electronic vehicle control units. In some implementations, a device (e.g., the test system 108) may perform or may be configured to perform the method 500. In some implementations, another device or a group of devices separate from or including the device (e.g., the user device 106) may perform or may be configured to perform the method 500. Additionally, or alternatively, one or more components of the device (e.g., the processor 420, the memory 430, the input component 440, the output component 450, and/or the communication component 460) may perform or may be configured to perform the method 500. Thus, means for performing the method 500 may include the device and/or one or more components of the device. Additionally, or alternatively, a non-transitory computer-readable medium may store one or more instructions that, when executed by the device, cause the device to perform the method 500.

As shown in FIG. 5, the method 500 may include receiving a vehicle topology associated with a vehicle (block 505). As further shown in FIG. 5, the method 500 may include generating predefined processes for components of the vehicle topology (block 510). As further shown in FIG. 5, the method 500 may include providing, to a user device, data identifying the predefined processes for the components of the vehicle topology (block 515). As further shown in FIG. 5, the method 500 may include receiving, from the user device, one or more user-defined processes and a selection of one or more of the predefined processes for execution of a test (block 520). As further shown in FIG. 5, the method 500 may include identifying one or more containers to be created for the one or more user-defined processes and the one or more of the predefined processes (block 525). As further shown in FIG. 5, the method 500 may include identifying one or more virtual networks to interconnect the one or more containers (block 530). As further shown in FIG. 5, the method 500 may include identifying an order of execution for the one or more user-defined processes and the one or more of the predefined processes (block 535). As further shown in FIG. 5, the method 500 may include generating a file that defines the one or more containers, the one or more virtual networks, and the order of execution (block 540). As further shown in FIG. 5, the method 500 may include causing the file to be implemented in a virtualized environment (block 545). As further shown in FIG. 5, the method 500 may include orchestrating the test via the one or more containers, the one or more virtual networks, and the order of execution (block 550). As further shown in FIG. 5, the method 500 may include generating results based on orchestration of the test (block 555). As further shown in FIG. 5, the method 500 may include performing one or more actions based on the results (block 560).

The method 500 may include additional aspects, such as any single aspect or any combination of aspects described below and/or described in connection with one or more other methods or operations described elsewhere herein.

In a first aspect, the vehicle topology includes one or more of a power system of an on-board system of the vehicle, one or more sensors of the on-board system of the vehicle, one or more controllers of the on-board system of the vehicle, or an on-board computing device of the on-board system of the vehicle.

In a second aspect, alone or in combination with the first aspect, generating the predefined processes for the components of the vehicle topology includes utilizing rules that simulate the components of the vehicle topology generate to the predefined processes.

In a third aspect, alone or in combination with one or more of the first and second aspects, providing the data identifying the predefined processes for the components of the vehicle topology includes storing the data identifying the predefined processes for the components of the vehicle topology in a library, and providing, to the user device, the data identifying the predefined processes for the components of the vehicle topology based on the user device accessing the library.

In a fourth aspect, alone or in combination with one or more of the first through third aspects, the user-defined processes simulate one or more of the components of the vehicle topology.

In a fifth aspect, alone or in combination with one or more of the first through fourth aspects, identifying the one or more containers to be created for the one or more user-defined processes and the one or more of the predefined processes includes analyzing requirements for the user-defined processes, identifying one or more containers in the virtualized environment capable of handling the requirements for the user-defined processes, analyzing requirements for the predefined processes, and identifying one or more additional containers in the virtualized environment capable of handling the requirements for the predefined processes.

In a sixth aspect, alone or in combination with one or more of the first through fifth aspects, identifying the one or more virtual networks to interconnect the one or more containers includes analyzing the vehicle topology to identify networks of the vehicle topology, determining requirements for the networks, and identifying the one or more virtual networks in the virtualized environment capable of handling the requirements for the networks.

In a seventh aspect, alone or in combination with one or more of the first through sixth aspects, identifying the order of execution for the one or more user-defined processes and the one or more of the predefined processes includes analyzing the one or more user-defined processes and the one or more of the predefined processes, and identifying the order of execution based on analyzing the one or more user-defined processes and the one or more of the predefined processes.

In an eighth aspect, alone or in combination with the first through seventh aspects, the file includes instructions that cause the virtualized environment to create the one or more containers, create the one or more virtual networks, and execute the test based on the order of execution and via the one or more containers and the one or more virtual networks.

In a ninth aspect, alone or in combination with the first through eighth aspects, the results include information identifying one or more of outputs of simulation of the components of the vehicle topology, or errors generated by simulation of the components of the vehicle topology.

In a tenth aspect, alone or in combination with the first through ninth aspects, performing the one or more actions includes providing the results for display to the user device, or validating the one or more user-defined processes and/or the one or more of the predefined processes based on the results.

In an eleventh aspect, alone or in combination with the first through tenth aspects, performing the one or more actions includes recommending a modification to one of the one or more user-defined processes based on the results, or recommending a modification to one of the one or more of the predefined processes based on the results.

In a twelfth aspect, alone or in combination with the first through eleventh aspects, performing the one or more actions includes modifying the test based on the results to generate a modified test, and causing the modified test to be executed to generate additional results.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

The following provides an overview of some Aspects of the present disclosure:

Aspect 1: A method, comprising: receiving, by a device, a vehicle topology associated with a vehicle; generating, by the device, predefined processes for components of the vehicle topology; providing, by the device and to a user device, data identifying the predefined processes for the components of the vehicle topology; receiving, by the device and from the user device, one or more user-defined processes and a selection of one or more of the predefined processes for execution of a test; identifying, by the device, one or more containers to be created for the one or more user-defined processes and the one or more of the predefined processes; identifying, by the device, one or more virtual networks to interconnect the one or more containers; identifying, by the device, an order of execution for the one or more user-defined processes and the one or more of the predefined processes; generating, by the device, a file that defines the one or more containers, the one or more virtual networks, and the order of execution; causing, by the device, the file to be implemented in a virtualized environment; orchestrating, by the device, the test via the one or more containers, the one or more virtual networks, and the order of execution; generating, by the device, results based on orchestration of the test; and performing, by the device, one or more actions based on the results.

Aspect 2: The method of Aspect 1, wherein the vehicle topology includes one or more of: a power system of an on-board system of the vehicle, one or more sensors of the on-board system of the vehicle, one or more controllers of the on-board system of the vehicle, or an on-board computing device of the on-board system of the vehicle.

Aspect 3: The method of Aspect 1, wherein generating the predefined processes for the components of the vehicle topology comprises: utilizing rules that simulate the components of the vehicle topology generate to the predefined processes.

Aspect 4: The method of Aspect 1, wherein providing the data identifying the predefined processes for the components of the vehicle topology comprises: storing the data identifying the predefined processes for the components of the vehicle topology in a library; and providing, to the user device, the data identifying the predefined processes for the components of the vehicle topology based on the user device accessing the library.

Aspect 5: The method of Aspect 1, wherein the user-defined processes simulate one or more of the components of the vehicle topology.

Aspect 6: The method of Aspect 1, wherein identifying the one or more containers to be created for the one or more user-defined processes and the one or more of the predefined processes comprises: analyzing requirements for the user-defined processes; identifying one or more containers in the virtualized environment capable of handling the requirements for the user-defined processes; analyzing requirements for the predefined processes; and identifying one or more additional containers in the virtualized environment capable of handling the requirements for the predefined processes.

Aspect 7: The method of Aspect 1, wherein identifying the one or more virtual networks to interconnect the one or more containers comprises: analyzing the vehicle topology to identify networks of the vehicle topology; determining requirements for the networks; and identifying the one or more virtual networks in the virtualized environment capable of handling the requirements for the networks.

Aspect 8: A device, comprising: one or more memories; and one or more processors, coupled to the one or more memories, configured to: provide, to a user device, data identifying predefined processes for components of a vehicle topology associated with a vehicle; receive, from the user device, one or more user-defined processes and a selection of one or more of the predefined processes for execution of a test; identify one or more containers to be created for the one or more user-defined processes and the one or more of the predefined processes; identify one or more virtual networks to interconnect the one or more containers; identify an order of execution for the one or more user-defined processes and the one or more of the predefined processes; generate a file that defines the one or more containers, the one or more virtual networks, and the order of execution; cause the file to be implemented in a virtualized environment; orchestrate the test via the one or more containers, the one or more virtual networks, and the order of execution; generate results based on orchestration of the test; and perform one or more actions based on the results.

Aspect 9: The device of claim 8, wherein the one or more processors, to identify the order of execution for the one or more user-defined processes and the one or more of the predefined processes, are configured to: analyze the one or more user-defined processes and the one or more of the predefined processes; and identify the order of execution based on analyzing the one or more user-defined processes and the one or more of the predefined processes.

Aspect 10: The device of Aspect 8, wherein the file includes instructions that cause the virtualized environment to create the one or more containers, create the one or more virtual networks, and execute the test based on the order of execution and via the one or more containers and the one or more virtual networks.

Aspect 11: The device of Aspect 8, wherein the results include information identifying one or more of: outputs of simulation of the components of the vehicle topology, or errors generated by simulation of the components of the vehicle topology.

Aspect 12: The device of Aspect 8, wherein the one or more processors, to perform the one or more actions, are configured to: provide the results for display to the user device; or validate the one or more user-defined processes and/or the one or more of the predefined processes based on the results.

Aspect 13: The device of Aspect 8, wherein the one or more processors, to perform the one or more actions, are configured to: recommend a modification to one of the one or more user-defined processes based on the results; or recommend a modification to one of the one or more of the predefined processes based on the results.

Aspect 14: The device of Aspect 8, wherein the one or more processors, to perform the one or more actions, are configured to: modify the test based on the results to generate a modified test; and cause the modified test to be executed to generate additional results.

Aspect 15: A non-transitory computer-readable medium storing a set of instructions, the set of instructions comprising: one or more instructions that, when executed by one or more processors of a device, cause the device to: receive a vehicle topology associated with a vehicle; generate predefined processes for components of the vehicle topology; provide, to a user device, data identifying the predefined processes for the components of the vehicle topology; receive, from the user device, one or more user-defined processes and a selection of one or more of the predefined processes for execution of a test; identify one or more containers to be created for the one or more user-defined processes and the one or more of the predefined processes; identify one or more virtual networks to interconnect the one or more containers; identify an order of execution for the one or more user-defined processes and the one or more of the predefined processes; cause the one or more containers, the one or more virtual networks, and the order of execution to be implemented in a virtualized environment; orchestrate the test via the one or more containers, the one or more virtual networks, and the order of execution; generate results based on orchestration of the test; and perform one or more actions based on the results.

Aspect 16: The non-transitory computer-readable medium of Aspect 15, wherein the one or more instructions, that cause the device to generate the predefined processes for the components of the vehicle topology, cause the device to: utilize rules that simulate the components of the vehicle topology generate to the predefined processes.

Aspect 17: The non-transitory computer-readable medium of Aspect 15, wherein the one or more instructions, that cause the device to provide the data identifying the predefined processes for the components of the vehicle topology, cause the device to: store the data identifying the predefined processes for the components of the vehicle topology in a library; and provide, to the user device, the data identifying the predefined processes for the components of the vehicle topology based on the user device accessing the library.

Aspect 18: The non-transitory computer-readable medium of Aspect 15, wherein the one or more instructions, that cause the device to identify the one or more containers to be created for the one or more user-defined processes and the one or more of the predefined processes, cause the device to: analyze requirements for the user-defined processes; identify one or more containers in the virtualized environment capable of handling the requirements for the user-defined processes; analyze requirements for the predefined processes; and identify one or more additional containers in the virtualized environment capable of handling the requirements for the predefined processes.

Aspect 19: The non-transitory computer-readable medium of Aspect 15, wherein the one or more instructions, that cause the device to identify the one or more virtual networks to interconnect the one or more containers, cause the device to: analyze the vehicle topology to identify networks of the vehicle topology; determine requirements for the networks; and identify the one or more virtual networks in the virtualized environment capable of handling the requirements for the networks.

Aspect 20: The non-transitory computer-readable medium of Aspect 15, wherein the one or more instructions, that cause the device to perform the one or more actions, cause the device to one or more of: provide the results for display to the user device; validate the one or more user-defined processes and/or the one or more of the predefined processes based on the results; recommend a modification to one of the one or more user-defined processes based on the results; or recommend a modification to one of the one or more of the predefined processes based on the results.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. Features from different implementations and/or aspects disclosed herein can be combined. For example, one or more features from a method implementations may be combined with one or more features of a device, system, or product implementation. Features described herein may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by a device, a vehicle topology associated with a vehicle;

generating, by the device, predefined processes for components of the vehicle topology;

providing, by the device and to a user device, data identifying the predefined processes for the components of the vehicle topology;

receiving, by the device and from the user device, one or more user-defined processes and a selection of one or more of the predefined processes for execution of a test;

identifying, by the device, one or more containers to be created for the one or more user-defined processes and the one or more of the predefined processes;

identifying, by the device, one or more virtual networks to interconnect the one or more containers;

identifying, by the device, an order of execution for the one or more user-defined processes and the one or more of the predefined processes;

generating, by the device, a file that defines the one or more containers, the one or more virtual networks, and the order of execution;

causing, by the device, the file to be implemented in a virtualized environment;

orchestrating, by the device, the test via the one or more containers, the one or more virtual networks, and the order of execution;

generating, by the device, results based on orchestration of the test; and performing, by the device, one or more actions based on the results.

2. The method of claim 1, wherein the vehicle topology includes one or more of:

a power system of an on-board system of the vehicle, one or more sensors of the on-board system of the vehicle, one or more controllers of the on-board system of the vehicle, or an on-board computing device of the on-board system of the vehicle.

3. The method of claim 1, wherein generating the predefined processes for the components of the vehicle topology comprises:

utilizing rules that simulate the components of the vehicle topology generate to the predefined processes.

4. The method of claim 1, wherein providing the data identifying the predefined processes for the components of the vehicle topology comprises:

storing the data identifying the predefined processes for the components of the vehicle topology in a library; and providing, to the user device, the data identifying the predefined processes for the components of the vehicle topology based on the user device accessing the library.

5. The method of claim 1, wherein the user-defined processes simulate one or more of the components of the vehicle topology.

6. The method of claim 1, wherein identifying the one or more containers to be created for the one or more user-defined processes and the one or more of the predefined processes comprises:

analyzing requirements for the user-defined processes;

identifying one or more containers in the virtualized environment capable of handling the requirements for the user-defined processes;

analyzing requirements for the predefined processes; and identifying one or more additional containers in the virtualized environment capable of handling the requirements for the predefined processes.

7. The method of claim 1, wherein identifying the one or more virtual networks to interconnect the one or more containers comprises:

analyzing the vehicle topology to identify networks of the vehicle topology;

determining requirements for the networks; and identifying the one or more virtual networks in the virtualized environment capable of handling the requirements for the networks.

8. A device, comprising:

one or more memories; and one or more processors, coupled to the one or more memories, configured to:

provide, to a user device, data identifying predefined processes for components of a vehicle topology associated with a vehicle;

receive, from the user device, one or more user-defined processes and a selection of one or more of the predefined processes for execution of a test;

identify one or more containers to be created for the one or more user-defined processes and the one or more of the predefined processes;

identify one or more virtual networks to interconnect the one or more containers;

identify an order of execution for the one or more user-defined processes and the one or more of the predefined processes;

generate a file that defines the one or more containers, the one or more virtual networks, and the order of execution;

cause the file to be implemented in a virtualized environment;

orchestrate the test via the one or more containers, the one or more virtual networks, and the order of execution;

generate results based on orchestration of the test; and perform one or more actions based on the results.

9. The device of claim 8, wherein the one or more processors, to identify the order of execution for the one or more user-defined processes and the one or more of the predefined processes, are configured to:

analyze the one or more user-defined processes and the one or more of the predefined processes; and identify the order of execution based on analyzing the one or more user-defined processes and the one or more of the predefined processes.

10. The device of claim 8, wherein the file includes instructions that cause the virtualized environment to create the one or more containers, create the one or more virtual networks, and execute the test based on the order of execution and via the one or more containers and the one or more virtual networks.

11. The device of claim 8, wherein the results include information identifying one or more of:

outputs of simulation of the components of the vehicle topology, or errors generated by simulation of the components of the vehicle topology.

12. The device of claim 8, wherein the one or more processors, to perform the one or more actions, are configured to:

provide the results for display to the user device; or validate the one or more user-defined processes and/or the one or more of the predefined processes based on the results.

13. The device of claim 8, wherein the one or more processors, to perform the one or more actions, are configured to:

recommend a modification to one of the one or more user-defined processes based on the results; or recommend a modification to one of the one or more of the predefined processes based on the results.

14. The device of claim 8, wherein the one or more processors, to perform the one or more actions, are configured to:

modify the test based on the results to generate a modified test; and cause the modified test to be executed to generate additional results.

15. A non-transitory computer-readable medium storing a set of instructions, the set of instructions comprising:

one or more instructions that, when executed by one or more processors of a device, cause the device to:

receive a vehicle topology associated with a vehicle;

generate predefined processes for components of the vehicle topology;

provide, to a user device, data identifying the predefined processes for the components of the vehicle topology;

receive, from the user device, one or more user-defined processes and a selection of one or more of the predefined processes for execution of a test;

identify one or more containers to be created for the one or more user-defined processes and the one or more of the predefined processes;

identify one or more virtual networks to interconnect the one or more containers;

identify an order of execution for the one or more user-defined processes and the one or more of the predefined processes;

cause the one or more containers, the one or more virtual networks, and the order of execution to be implemented in a virtualized environment;

orchestrate the test via the one or more containers, the one or more virtual networks, and the order of execution;

generate results based on orchestration of the test; and perform one or more actions based on the results.

16. The non-transitory computer-readable medium of claim 15, wherein the one or more instructions, that cause the device to generate the predefined processes for the components of the vehicle topology, cause the device to:

utilize rules that simulate the components of the vehicle topology generate to the predefined processes.

17. The non-transitory computer-readable medium of claim 15, wherein the one or more instructions, that cause the device to provide the data identifying the predefined processes for the components of the vehicle topology, cause the device to:

store the data identifying the predefined processes for the components of the vehicle topology in a library; and provide, to the user device, the data identifying the predefined processes for the components of the vehicle topology based on the user device accessing the library.

18. The non-transitory computer-readable medium of claim 15, wherein the one or more instructions, that cause the device to identify the one or more containers to be created for the one or more user-defined processes and the one or more of the predefined processes, cause the device to:

analyze requirements for the user-defined processes;

identify one or more containers in the virtualized environment capable of handling the requirements for the user-defined processes;

analyze requirements for the predefined processes; and identify one or more additional containers in the virtualized environment capable of handling the requirements for the predefined processes.

19. The non-transitory computer-readable medium of claim 15, wherein the one or more instructions, that cause the device to identify the one or more virtual networks to interconnect the one or more containers, cause the device to:

analyze the vehicle topology to identify networks of the vehicle topology;

determine requirements for the networks; and identify the one or more virtual networks in the virtualized environment capable of handling the requirements for the networks.

20. The non-transitory computer-readable medium of claim 15, wherein the one or more instructions, that cause the device to perform the one or more actions, cause the device to one or more of:

provide the results for display to the user device;

validate the one or more user-defined processes and/or the one or more of the predefined processes based on the results;

recommend a modification to one of the one or more user-defined processes based on the results; or recommend a modification to one of the one or more of the predefined processes based on the results.

* * * * *